United States Patent [19]

Suzuki

[11] Patent Number: 5,041,868

[45] Date of Patent: Aug. 20, 1991

[54] METHOD AND APPARATUS FOR DETERMINING PRINTING EXPOSURE AMOUNT

[75] Inventor: Kenji Suzuki, Kanagawa, Japan

[73] Assignee: Fuji Photo Film Co., Ltd., Kanagawa, Japan

[21] Appl. No.: 584,028

[22] Filed: Sep. 18, 1990

[30] Foreign Application Priority Data

Sep. 18, 1989 [JP] Japan .................................. 1-240979

[51] Int. Cl.$^5$ ............................................ G03B 27/80
[52] U.S. Cl. ........................................ 355/68; 355/77
[58] Field of Search ..................... 355/244, 40, 41, 68, 355/77, 74

[56] References Cited

U.S. PATENT DOCUMENTS

| | | | |
|---|---|---|---|
| 4,285,543 | 8/1981 | Vinatzer | 355/68 |
| 4,359,273 | 11/1982 | Aihara et al. | 354/50 |
| 4,444,506 | 4/1984 | Isono et al. | 355/38 X |
| 4,525,065 | 6/1985 | Takagi et al. | 355/77 |
| 4,984,015 | 1/1991 | Okino | 355/68 |

Primary Examiner—Brian W. Brown
Assistant Examiner—D. Rutledge
Attorney, Agent, or Firm—Sughrue, Mion, Zinn, Macpeak & Seas

[57] ABSTRACT

A photographic printer for making a trimming print has a zoom lens whose focal length can be changed in accordance with a trimming magnification. Exposure time is corrected based on a reciprocity law failure correction amount corresponding to the magnification of the zoom lens, whereby a density of the photoprint is corrected as to a change in a reciprocity law failure. According to a preferred embodiment, test prints are made respectively at a plurality of magnifications of the zoom lens. The densities of the finished test print are measured to form reciprocity law failure correction data automatically in the photographic printer so that the measured densities coincide with standard densities.

12 Claims, 4 Drawing Sheets

METHOD AND APPARATUS FOR DETERMINING PRINTING EXPOSURE AMOUNT

BACKGROUND OF THE INVENTION

The present invention relates to a printing exposure amount determining method and apparatus for a photographic printer which uses a zoom lens to make a trimming print, and more particularly to a method and apparatus for calculating an appropriate printing exposure amount in consideration of a reciprocity law failure raised dependent on the printing magnification.

In a general type of conventional photographic printer, photoprints are made at one of several magnifications in a discrete or stepwise manner, the magnification being determined by a frame size of a photographic film such as a negative film and a print size. A printing exposure condition is set in response to the stepwise magnification in the photographic printer. It also is known that a photographic printer can make a trimming print at any specified printing magnification by using a zoom lens.

However, in the photographic printer for trimming prints, the f-number of the zoom lens is varied corresponding to the magnification which is determined by a focal length of the zoom lens. Further, the exposure time changes corresponding to the magnification to such an extent that a reciprocity law failure of photographic paper increases considerably and is not negligible. Therefore, there is a problem in that an unchanged density of an image cannot be reproduced on the finished photoprint when the magnification is changed.

Therefore, it is an object of the present invention to provide a method and apparatus for determining the printing exposure amount, wherein a trimming print can be made at an appropriate density for an exposure at any specified magnification of the zoom lens.

SUMMARY OF THE INVENTION

To achieve the above and other objects in the present invention, an exposure time T is calculated from an equation:

$$T = T_0 \cdot [f^2(M) \cdot (1 + M \cdot \phi_{EN}/\phi_{EX})^2]/[f^2(M_0) \cdot (1 + M_0 \cdot \phi_{EN}/\phi_{EX})^2]$$

where $T_0$ is a reference exposure time corresponding to a reference magnification $M_0$ of the zoom lens, $f(M_0)$ is a lens f-number corresponding to the reference magnification $M_0$, and $f(M)$ is a lens f-number corresponding to the specified lens magnification M, $\phi_{EN}$ is a diameter of the entrance pupil, and $\phi_{EX}$ is a diameter of the exit pupil, in which $\phi_{EX}/\phi_{EN} = 1$ except for a retrofocus lens. A reciprocity law failure correction amount corresponding to the exposure time T is obtained with reference to data constituting a relationship between an exposure time T and a reciprocity law failure correction amount TSB. The printing exposure amount for an image frame to be printed is determined by taking into account the reciprocity law failure correction amount TSB.

The data may be obtained in designing a photographic printer, and may be written in read-only memory (ROM). Alternatively, the data may be obtained by making test prints when setting up the photographic printer, renewing the zoom lens, or changing photographic paper, and may be written in random access memory (RAM) such as a look-up table memory. To obtain correction data for reciprocity law failure in the printer, it is preferable to dispose a densitometer along the path in which prints travel, and to process on-line a measured density in the computer connected with the densitometer. This construction makes it easy to obtain the correction data, as an operator needs only to make test prints when the type of photographic paper is changed.

According to the present invention, an appropriate printing exposure thereby is effected at any specified magnification so as to finish a photoprint of an unchanged density. The influence of reciprocity law failure can be reduced to carry out an appropriate printing exposure even if an image frame to be printed is an over-exposure or super-over-exposure frame at the time of trimming. Since correction data can be made by means of the same printer, each photofinishing laboratory can obtain correction data suitable for changed color paper even when the color paper has a different characteristic in the reciprocity law failure. Although different types of color paper are used, it is possible to make photoprints of an unchanged density by reducing the influence of a reciprocity law failure.

BRIEF DESCRIPTION OF THE DRAWINGS

The above mentioned objects, features and advantages of the invention will become more apparent upon a reading of the following detailed description and drawings, in which.

DETAILED DESCRIPTION OF THE PREFERRED EMBODIMENTS

Figure 2:
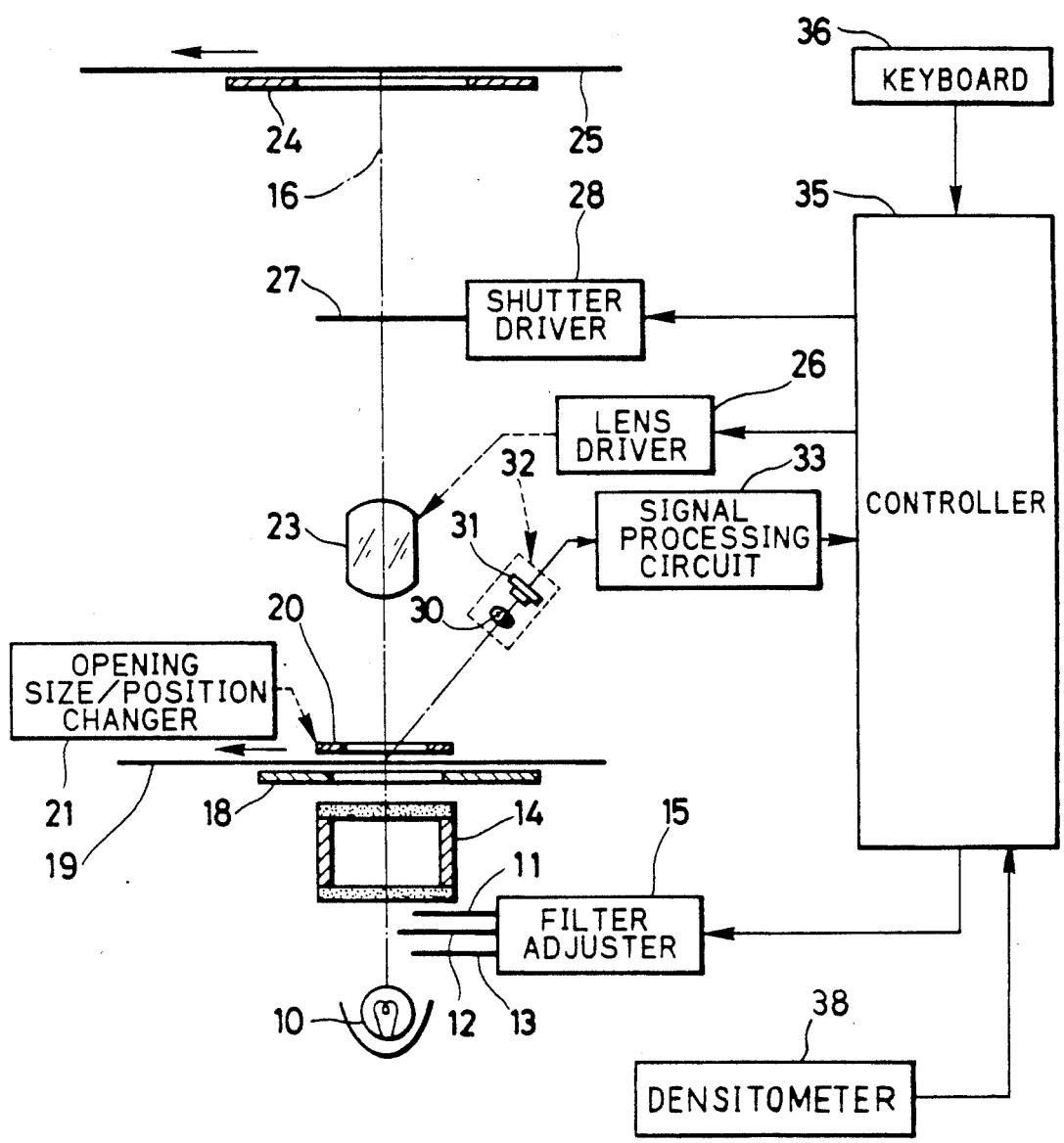
FIG. 2 is a schematic diagram showing a printer with the apparatus shown in FIG. 1.

FIG. 2 shows a photographic printer employing an apparatus according to a preferred embodiment of the present invention. White light emitted from a light source 10 enters a mixing box 14 after passing through cyan, magenta, and yellow correction filters 11, 12, and 13. A filter adjuster 15 controls the degree of insertion of these color correction filters 11, 12, and 13 into an optical path 16 of the printing light so as to regulate the three primary color components and the intensity of the printing light. The mixing box 14 has the shape of a rectangular tube with inner mirrored walls, and has a diffusion plate mounted at each of opposite ends thereof.

A film holder 18 is disposed at a printing station, on which a photographic film, e.g. a processed negative film 19, is to be set and illuminated by the light transmitted through the mixing box 14. A variable film mask 20 is mounted on the film holder 18 in order to keep the negative film 19 flat. The opening size and the opening position of the variable film mask 20 are changed by an opening size/position changer 21 in accordance with a trimming condition.

A zoom lens 23, disposed over the film holder 18, enlarges and projects an image frame of the negative film 19 at the printing station toward color paper 25 disposed behind a paper mask 24. A lens driver 26 changes the focal length of the zoom lens 23 to change the magnification of the zoom lens 23. A shutter 27, disposed between the zoom lens 23 and the color paper 25, has its opening/closing operation controlled by a shutter driver 28.

A scanner 32 consisting of a lens 30 and an image area sensor 31 is disposed upstream from and above the variable film mask 20 along the path of the negative film 19. By means of the scanner 32, the transmitted light of each point in the image frame set at the printing station is subjected to three color separation photometry. The signal from the scanner 32 is sent to a signal processing circuit 33, and is converted logarithmically and digitally therein. The converted signal for each point, for each of the three colors is sent to the controller 35 as a density signal (strictly speaking, a logarithmically converted value according to the density).

A controller 35 is constituted by a microcomputer, as is well known, and has a keyboard 36 having alphabetic and numeric keys connected thereto. Trimming information, such as a magnification for a trimming print and a trimming condition, is entered in the keyboard 36 just before a printing operation. In accordance with the specified magnification, the controller 35 changes a focal length of the zoom lens 23 to the specified magnification for trimming-printing through the lens driver 26, and calculates a reciprocity law failure correction amount $TSB_i$ corresponding to the specified magnification of the lens 23. After correcting the exposure amount according to the reciprocity law failure correction amount $TSB_i$, the controller 35 adjusts the color correction filters 11, 12, and 13 through the filter adjuster 15, and controls the operation of the shutter 27 through the shutter driver 28.

Figure 1:
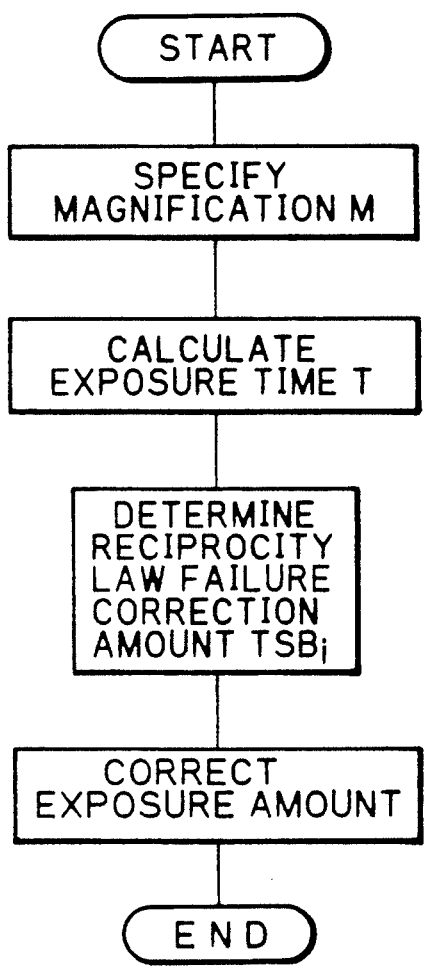
FIG. 1 is a flow chart showing a procedure for correcting a printing exposure amount by a printing exposure amount determining apparatus embodying the present invention.
Figure 3:
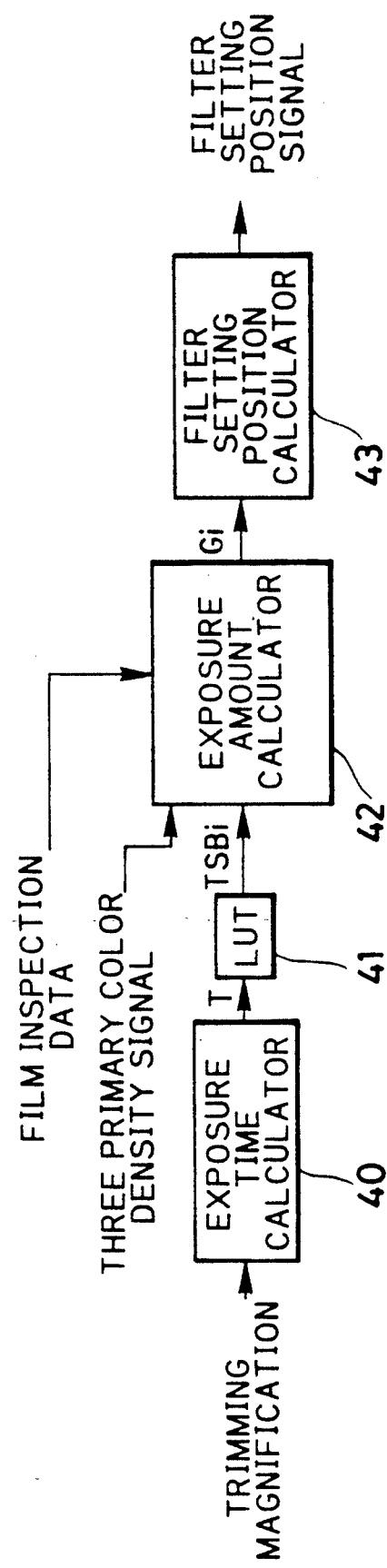
FIG. 3 is a block diagram depicting correction of the exposure amount in a controller shown in FIG. 2.

FIG. 1 shows a procedure for calculating the reciprocity law failure correction amount $TSB_i$, and FIG. 3 shows a functional block of the controller 35 for this calculation. When a specified magnification (trimming magnification) M of the lens 23 is entered by operating the keyboard 36, an exposure time calculator 40 contained in the controller 35 calculates an exposure time T corresponding to the specified magnification M on the basis of the following equation (1):

$$T = T_0 \cdot [f^2(M) \cdot (1 + M \cdot \phi_{EN}/\phi_{EX})^2]/[f^2(M_0) \cdot (1 + M_0 \cdot \phi_{EN}/\phi_{EX})^2] \quad (1)$$

where
M is the specified magnification of the lens,
$M_0$ is a reference magnification of the lens,
f(M) is a lens f-number corresponding to the specified magnification M,
$f(M_0)$ is a lens f-number corresponding to the reference magnification $M_0$,
$T_0$ is a reference exposure time corresponding to the reference magnification $M_0$,
$\phi_{EN}$ is a diameter of the entrance pupil, and
$\phi_{EX}$ is a diameter of the exit pupil, in which $\phi_{EX}/\phi_{EN} = 1$ except for a retrofocus lens.

The equation (1) now will be described in detail. Since the f-number of a lens in general indicates its lens speed under the condition that an image of an object existing in the infinite distance is focussed on the focal plane the change of the magnification M varies the effective f-number of the lens (i.e., $f_{EF}$). Therefore, the effective f-numbers $f_{EF}(M)$ and $f_{EF}(M_0)$ corresponding to the respective specified magnification M and the reference magnification $M_0$ are determined as:

$$f_{EF}(M) = f(M) \cdot (1 + M \cdot \phi_{EN}/\phi_{EX})$$

$$f_{EF}(M_0) = f(M_0) \cdot (1 + M_0 \cdot \phi_{EN}/\phi_{EX})$$

In the meantime, an exposure amount E will be obtained as follows:

$$E = \log_2(f_{EF}^2/T)$$

As the exposure amount E is kept unchanged independent of the magnification of the zoom lens 23, the following relation is obtained:

$$f_{EF}^2(M)/T = f_{EF}^2(M_0)/T_0$$

The equation (1) can be obtained by representing $f_{EF}(M)$ and $f_{EF}(M_0)$ in the above relation as f(M), $f(M_0)$, M and $M_0$.

Figure 4:
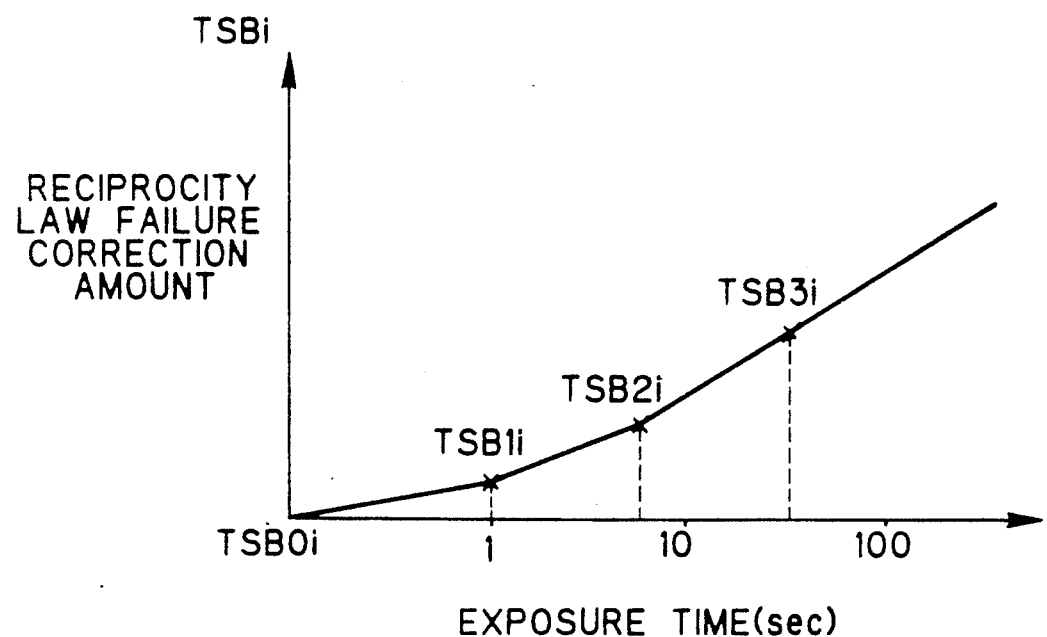
FIG. 4 is a graph showing a reciprocity law failure correcting curve.

Thereafter, according to the exposure time T calculated from the exposure time calculator 40, the reciprocity law failure correction amount $TSB_i$ (i being one of red, green, and blue) is obtained color by color from a look-up table memory (LUT) 41 which stores data of the relationship between the exposure time T and the reciprocity law failure correction amount $TSB_i$ as shown in FIG. 4. An exposure amount calculator 42 calculates an exposure gain value $G_i$ based on the following exposure gain value calculating equation (2) in accordance with the obtained correction amount $TSB_i$, a density signal for the three colors at each point generated by the scanner 32 and, if necessary, inputted film inspection data:

$$G_i = S_i \cdot C_i \cdot (D_i - DN_i) + a_i + TSB_i \quad (2)$$

where:
S is a color slope coefficient,
C is a color correction coefficient,
α is a constant determined by a combination of the film, color paper, printing lens, etc.,
D is an average density of the image frame of the film, and
DN is an average density of the control negative film.

Upon receiving the gain value $G_i$, a filter setting position calculator 43 generates a filter setting position signal based on a relation between the filter setting position and the gain value $G_i$ corresponding to the exposure time T, as is well known. This filter setting position signal is sent to the filter adjuster 15 so that the setting positions of the filters 11, 12, and 13 are controlled.

An example of a curve defining the reciprocity law failure correction amount stored in the LUT 40 is shown in FIG. 4. Obtaining this reciprocity law failure correction curve now will be described. An ND film for setting printing condition or a mesh having the density $DN_i$ respectively is set on the film holder 18. A test print is made from this ND film under the reference condition (magnification $M = M_0 = 3.62$, exposure time $T = T_0 = 260$ msec) so that the three color density value $D_j$ (j is one of cyan, magenta, and yellow) of the finished test print is to be a standard density value $DS_j$ of a finished photoprint. i.e. $DS_C = 0.7 \pm 0.03$, $DS_M = 0.6 \pm 0.03$, and $DS_Y = 0.5 \pm 0.03$, by measuring the test print with a densitometer. To adjust the density $D_j$, $TSB0_i$ is finely adjusted. To be precise, a reciprocity law failure correction amount $TSB0_i$ is determined when the three color density $D_j$ of the finished test print has the above value, while a value of the reciprocity law failure correction amount $TSB0_i$ under the condition $D_i - DN_i = 0$ in the following equation (3) is being changed finely by operating keys on the keyboard 36:

$$G_i = S_i \cdot C_i \cdot (D_i - DN_i) + a_i + TSB0_i \qquad (3)$$

Then, a test print is made from this ND film under a condition where the magnification $M = M_{T=1.0}$ and the exposure time $T = 1.0$ sec. It is noted that $M_{T=1.0}$ is a value of M obtained by solving the equation (1) by letting T equal to 1.0. Such a test print is made so that the three color density value $D_j$ of the finished test print is to be a standard density value $DS_j$ of a finished photoprint, i.e. $DS_C = 0.7 \pm 0.03$, $DS_M = 0.6 \pm 0.03$ and $DS_Y = 0.5 \pm 0.03$, by measuring the test print with a densitometer. To adjust the density $D_j$, $TSB1_i$ is finely adjusted. To be precise, a reciprocity law failure correction amount $TSB1_i$ is determined when the three color density $D_j$ of the finished test print has the above value while a value of the reciprocity law failure correction amount $TSB1_i$ under the condition $D_i - DN_i = 0$ in the following equation (4) is being changed finely by operating keys on the keyboard 36:

$$G_i = S_i \cdot C_i \cdot (D_i - DN_i) + a_i + TSB0_i + TSB1_i \qquad (4)$$

Similarly, a test print is made from this ND film under a condition where the magnification $M = 17.0$ and the exposure time $T = T_{M=17.0}$ sec. It is noted that $T_{M=17.0}$ is a value calculated from the equation (1) as $M = 17.0$. Such a test print is made so that the three color density value $D_j$ of the finished test print is to be a standard density value $DS_j$ of a finished photoprint. i.e. $DS_C = 0.7 \pm 0.03$, $DS_M = 0.6 \pm 0.03$, and $DS_Y = 0.5 \pm 0.03$ while adjusting $TSB2_j$ as shown in the following equation (5):

$$G_i = S_i \cdot C_i \cdot (D_i - DN_i) + a_i + TSB0_i + TSB1_i + TSB2_i \qquad (5)$$

Finally, a super-over-exposure negative film having a density $D_i$ is set at the printing station instead of the ND film so as to obtain a value $TSB3_i$ in a manner similar to the above.

When a YES key on the keyboard 36 is pushed, the values $TSB1_i$, $TSB2_i$ and $TSB3_i$, determined as above then are stored in a memory of the controller 35. The controller 35 thereafter retrieves the values $TSB1_i$, $TSB2_i$, and $TSB3_i$ from the memory, plots them in a coordinate system with the exposure time T (sec) as the abscissa and the reciprocity law failure correction amount $TSB_i$ as the ordinate, and performs an interpolation according to the points defined by the correction amount values on the graph by a straight line between them so as to draw a reciprocity law failure correction curve as shown in FIG. 4. It is noted that, since the value $TSB0_i$ can be considered as a constant, it is plotted as zero for the reciprocity law failure correction amount in the co-ordinate system. The reciprocity law failure correction curve obtained in this manner for each color is written in the LUT 41 for each color. More precisely the reciprocity law failure correction amount $TSB_i$ is written at a memory location in LUT 41 addressed by the exposure time T.

As is described above, the reciprocity law failure correction amounts $TSB1_i$ to $TSB3_i$, are determined when the measured density value $D_j$ of the finished test prints coincides with the standard density value $DS_j$, while the values $TSB1_i$ to $TSB3_i$ are being changed finely by a manual operation. Instead of the above method, it is preferable automatically to obtain data of the values $TSB1_i$ to $TSB3_i$ according to an on-line processing by disposing a densitometer 38 along the path of finished prints at a position between the processor and the outlet of the printer, as shown in FIG. 2. For this operation, the mode for forming reciprocity law failure correction data is selected by operating the keyboard 36. Upon actuation for making test prints in accordance with an instruction indicated on a display (not shown), the density of finished test prints is measured automatically by the densitometer 38 of the printer so as to send the measured density value $D_j$ to the controller 35. The controller 35 determines the value $TSB1_i$ according to the difference between the measured density value $D_j$ and the standard density value $DS_j$. If the difference between $D_j$ and $DS_j$ is considerable, the controller 35 gives the operator an instruction on the display to make another test print in the condition of the determined $TSB1_i$. The values $TSB2_i$ and $TSB3_i$ are obtained in similar fashion. Since the operator needs only to make test prints in accordance with the instruction on the display without finely adjusting the reciprocity law failure correction amount, it is very easy to form the reciprocity law failure correction data.

It is to be noted that the reciprocity law failure correction curve for each color is renewed by the above-described process when the color paper is changed to one having widely different characteristics, or the zoom lens 23 is renewed. Although the curve of the reciprocity law failure correction amount $TSB_i$ is drawn by linear interpolation based on the four points of the values $TSB0_i$, $TSB1_i$, $TSB2_i$ and $TSB3_i$, it also may be drawn by curvilinear interpolation. Further, linear interpolation may be performed based on the three points other than that of the value $TSB3_i$ so as to obtain the value $TSB3_i$. Although the ND film is set at the film holder 18 in obtaining $TSB0_i$, $TSB1_i$, and $TSB2_i$, a normal control negative film having the density $D_i$ may also be used instead.

The operation of the above embodiment now will be described. The negative film 19 is carried in the film holder 18 of the photographic printer shown in FIG. 2. An image frame of the negative film 19 to be printed is set at the printing station. The magnification M for a trimming print is inputted by the keyboard 36. Through the lens driver 26, the controller 35 changes the focal length of the zoom lens 23 in accordance with the inputted magnification M. The exposure time T is calculated corresponding to the specified magnification M on the basis of the above equation (1). According to the exposure time T, the reciprocity law failure correction amount $TSB_i$ is obtained. During or after the calculation, the image frame to be printed is subjected to photometry by the scanner 32.

The controller 35 calculates the exposure gain value $G_i$ by the equation (2) from the measured three color density value, negative film inspection data inputted if necessary, and the reciprocity law failure correction amount $TSB_i$ thus obtained, and calculates each filter setting position in accordance with the gain value $G_i$. The controller 35 adjusts the insertion degree of the color correction filters into the optical path 16 of the printing light by controlling the filter adjuster 15 on the basis of the filter setting position signal. After adjusting the filters, the shutter 27 opens throughout the exposure time T to allow printing an image of the negative film 19 on the color paper 25. Similarly, necessary image frames of the negative film 19 are printed.

It is to be noted that the exposure time can be corrected to be longer still, if an exposure control is not effective only with the correction of the filter setting position, for example if an image frame to be printed is an over-exposure or super-over-exposure frame. In such a case a reciprocity law failure correction amount $TSB_i$ can be obtained corresponding to the lengthened exposure time so that finer correction can be made by correcting the initial value of the reciprocity law failure correction amount in accordance with the difference between the initial and renewed values.

In the above embodiment, the magnification for trimming is specified manually. However, in printing a negative film on which trimming information such as a magnification has been recorded together with a photographed image, the trimming information may be read automatically upon setting the image frame to be printed at the printing station so as to change the magnification and correct the exposure amount in accordance with the trimming information.

Although the above embodiment has a construction in which the data of a relationship between the exposure time T and the reciprocity law failure correction amount $TSB_i$ are measured in each photographic printer and stored in the look-up table memory 41, yet a memory such as ROM may be adapted instead to store data of such a relationship predetermined in designing the photographic printer, and be set in the photographic printer. The present invention also may be utilized for correcting a reciprocity law failure involved with monochrome photographic paper.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A method for determining a printing exposure amount for making a trimming print at a specified magnification M by changing a focal length of a zoom lens in a photographic printer, said method comprising the following steps:

calculating an exposure time T for said trimming print by an equation $$T = T_0 \cdot [f^2(M) \cdot (1 + M \cdot \phi_{EN}/\phi_{EX})^2]/[f^2(M_0) \cdot (1 + M_0 \cdot \phi_{EN}/\phi_{EX})^2]$$

where $T_0$ is a reference exposure time corresponding to a reference magnification $M_0$ of said zoom lens, $f(M_0)$ is a lens f-number corresponding to said reference magnification $M_0$, $f(M)$ is a lens f-number corresponding to said specified magnification M, $\phi_{EN}$ is a diameter of an entrance pupil of said zoom lens, and $\phi_{EX}$ is a diameter of an exit pupil of said zoom lens;

obtaining a reciprocity law failure correction amount corresponding to said exposure time T based on data of a relationship between an exposure time and a reciprocity law failure correction amount of color paper; and determining said printing exposure amount for an image frame to be printed in said photographic printer based on said obtained reciprocity law failure correction amount.

2. A method as defined in claim 1, wherein said data are formed by making test prints sequentially at different values of exposure time according to a plurality of magnifications of said zoom lens, measuring a density of each of said test prints by use of a densitometer incorporated in said photographic printer, and automatically calculating reciprocity law failure correction amounts corresponding to said values of exposure time in accordance with a difference between said measured density and a standard density.

3. A method as defined in claim 2, wherein said data are stored in a look-up table memory.

4. A method as defined in claim 1, wherein said data are obtained by making test prints from an ND film with a plurality of printing conditions in changing a reciprocity law failure correction amount so that each of said test prints is finished in three predetermined color densities under a plurality of different zoom lens magnification conditions and different exposure times for said trimming print.

5. A method as defined in claim 4, wherein a super-over-exposure film is used to obtain said data in addition to said ND film.

6. A method as defined in claim 1, wherein said data are stored in a look-up table memory.

7. A method as defined in claim 1, wherein said data are stored in a read-only memory (ROM).

8. An apparatus for determining a printing exposure amount for making a trimming print at a specified magnification M by changing a focal length of a zoom lens in a photographic printer, comprising:

means for calculating an exposure time T for said trimming print according to an equation $$T = T_0 \cdot [f^2(M) \cdot (1 + M \cdot \phi_{EN}/\phi_{EX})^2]/[f^2(M_0) \cdot (1 + M_0 \cdot \phi_{EN}/\phi_{EX})^2]$$

where $T_0$ is a reference exposure time corresponding to a reference exposure time corresponding to a reference magnification $M_0$ of the zoom lens, $f(M_0)$ is a lens f-number corresponding to said reference magnification $M_0$, $f(M)$ is a lens f-number corresponding to said specified lens magnification M, $\phi_{EN}$ is a diameter of an entrance pupil of said zoom lens, and $\phi_{EX}$ is a diameter of an exit pupil of said zoom lens;

means for outputting a reciprocity law failure correction amount corresponding to said exposure time T based on data constituting a relationship between an exposure time for said trimming print and a reciprocity law failure correction amount of color paper; and means for determining said printing exposure amount for an image frame to be printed in said photographic printer based on said outputted reciprocity law failure correction amount.

9. An apparatus as defined in claim 8, wherein said reciprocity law failure correction outputting means comprises a look-up table memory.

10. An apparatus as defined in claim 8, wherein said reciprocity law failure correction amount outputting means comprises a read-only memory (ROM).

11. An apparatus as defined in claim 8, further comprising:

a densitometer for measuring a density of said test print; and calculating means, connected to said densitometer, for automatically calculating a reciprocity law failure correction amount corresponding to a difference between a measured density of said test print and a standard density so as to cause said reciprocity law failure correction amount outputting means to store said reciprocity law failure correction amount.

12. An apparatus as defined in claim 11, wherein said densitometer is disposed along a path of a processed print in said photographic printer.

* * * * *